United States Patent Office.

ADOLPH C. SCHULZ, OF DETROIT, MICHIGAN, ASSIGNOR OF TWO-THIRDS TO GEORGE A. FICKE AND FREDERICK WILHELM, OF CINCINNATI, OHIO.

CEMENT AND ARTIFICIAL-STONE COMPOSITION.

SPECIFICATION forming part of Letters Patent No. 723,494, dated March 24, 1903.

Application filed January 8, 1903. Serial No. 138,290. (No specimens.)

*To all whom it may concern:*

Be it known that I, ADOLPH C. SCHULZ, a citizen of the United States, residing at Detroit, in the county of Wayne and State of Michigan, have invented certain new and useful Improvements in Cement and Artificial-Stone Compositions, of which the following is a full, clear, and exact description.

My invention relates to improvements in the compositions employed in the manufacture of cement and artificial stone for use either as a mortar in stone and brick work or when used as an artificial stone for building-blocks and paving material and the like; and it consists of the various ingredients to be hereinafter particularly pointed out and claimed.

My improved composition consists of finely-pulverized burnt or vitrified clay or brick and gravel or any other kind of a pebble stone used with lime to form either a hydraulic cement or a hydraulic petrifier, as the case may be.

In forming my composition I prefer to take the following proportions, by weight or its equivalent in measurement, of five and twenty-five hundredths (5.25) parts of burnt or vitrified clay or brick, five and ninety hundredths (5.90) parts of gravel, and eight and eighty-five hundredths (8.85) parts of burnt lime, in the total of twenty (20) pounds, and of the same proportions in larger quantities.

The burnt or vitrified clay or brick and the gravel and the burnt lime are crushed and pulverized, together or separately, and in this form the composition makes a hydraulic cement which may be used the same as any other cement, the time of its setting depending upon the quantity of water used when making it into mortar by itself or in connection with the other materials used in making mortar.

If the powders of the burnt or vitrified clay or brick and of the gravel are used in connection with slaked lime, said powder may be called a "hydraulic petrifier," the powdered vitrified clay or brick acting as a hydraulic agent and the powdered gravel as a petrifying or hardening agent in connection with the lime.

For ordinary building purposes or plastering, especially for surface work or even foundations where clay brick are used the petrifier can be best used in connection with slaked lime, but for foundation masonry when clay brick are not used it would be preferable to use the cement as a mortar.

While I prefer to use the proportions of burnt or vitrified clay or brick, gravel, and lime as above set forth, of course it will be understood that the proportions may be changed to suit the requirements and the nature of the work. The principle of my invention is the combining of the burnt or vitrified clay or brick and gravel in a pulverized state in connection with pulverized burnt lime as a hydraulic cemet or with slaked lime as a hydraulic petrifier, and the same in the stated proportions in particular.

Having thus described my invention, what I claim, and desire to secure by Letters Patent, is—

A composition of matter for use as a hydraulic cement or petrifier consisting of burnt or vitrified clay or brick and gravel in the pulverized state and lime, substantially as set forth.

ADOLPH C. SCHULZ.

Witnesses:
PAUL O. SCHNEIDER,
EDWIN A. RUCKSTUHL.